(12) United States Patent
Fahs et al.

(10) Patent No.: US 7,124,254 B2
(45) Date of Patent: Oct. 17, 2006

(54) METHOD AND STRUCTURE FOR MONITORING POLLUTION AND PREFETCHES DUE TO SPECULATIVE ACCESSES

(75) Inventors: Brian M. Fahs, Champaign, IL (US); Sreekumar Nair, Sunnyvale, CA (US); Santosh G. Abraham, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 343 days.

(21) Appl. No.: 10/840,154

(22) Filed: May 5, 2004

(65) Prior Publication Data

US 2005/0251629 A1   Nov. 10, 2005

(51) Int. Cl.
*G06F 12/00* (2006.01)

(52) U.S. Cl. .................. 711/144; 711/141; 711/145

(58) Field of Classification Search ................ None
See application file for complete search history.

(56) References Cited

U.S. PATENT DOCUMENTS

| 6,438,673 | B1* | 8/2002 | Jourdan et al. | 711/213 |
| 6,725,338 | B1* | 4/2004 | Gomez et al. | 711/137 |
| 7,010,648 | B1* | 3/2006 | Kadambi et al. | 711/118 |
| 7,051,192 | B1* | 5/2006 | Chaudhry et al. | 712/218 |

* cited by examiner

*Primary Examiner*—T Nguyen
(74) *Attorney, Agent, or Firm*—Gunnison, McKay & Hodgson, L.L.P.; Philip J. McKay

(57) ABSTRACT

A method and structure for equipping a cache with information to enable the processor to track and report whether a given speculative access causes prefetches and/or pollutions of the cache. Two types of events are tracked in one of two different ways: first by counting/tracking prefetch operations, either globally or on a per instruction address basis and then by counting/tracking cache pollutions, either globally or on a per instruction address basis.

10 Claims, 3 Drawing Sheets

METHOD AND STRUCTURE FOR MONITORING POLLUTION AND PREFETCHES DUE TO SPECULATIVE ACCESSES

FIELD OF THE INVENTION

The present invention relates generally to processor architecture and, in particular, to a method and structure for cache memory management and the monitoring of cache pollution and prefetches due to speculative accesses.

BACKGROUND OF THE INVENTION

In the most general case, speculative memory accesses are accesses made to the memory system by the processor that do not directly contribute to program output but are made in an attempt to speed up processor performance.

Speculative memory accesses are made for various purposes and are of many varieties including, but not limited to: prefetch memory accesses; wrong-path memory accesses; various memory accesses made while the processor is in a speculative state such as speculatively executing ahead for pre-fetching, also known as scouting, and/or any other memory accesses performed in an attempt to prefetch data from the memory system to the on-chip memory cache before the data is actually needed by the processor.

A problem with speculative memory accesses arises when a speculative access is made to a cache line that will not be used since, when this occurs, the speculative access then installs a cache line into the cache which forces another cache line to be removed from the cache. In a set-associative cache, this, in turn, changes the replacement ordering of other cache lines in the set and has significant detrimental effect on the system performance.

In particular, when a processor accesses a cache, if the cache line needed is not already present in the cache, the cache line is fetched from a lower level memory and then inserted into the cache. This process typically takes multiple clock cycles. The data is inserted at a specific cache line in the cache and any data already in that cache line is displaced out of the cache, back into a lower level memory directly, or by a reordering of another cache line within the cache.

If, as is often the case in modern system architectures, the cache is set-associative, then this displacement of the data in the cache line used for the speculative access causes a modification to the order in which the other cache lines will be displaced, once again causing a reordering and cache line displacement. If the speculative data is subsequently accessed, then the speculative memory access was a useful prefetch and the reordering is justified. However, if the data in one of the displaced cache lines is subsequently accessed, but is no longer in the cache due to displacement by the speculative access, then the speculative access is said to have caused a pollution. Significantly, a single speculative access may cause multiple pollution events in set-associative caches. Consequently, the disruption and detrimental effects of a single speculative access can be quite significant As the speed/frequency of processors increases, the disparity between processor speeds and memory system speeds continues to grow. As a result, speculative memory access has come to play an increasingly critical role in ensuring program performance and allowing systems to take advantage of processor potential. Consequently, the problems created by speculative accesses to cache lines that will not be used is becoming more and more significant and can no longer be overlooked or accepted.

What is needed is a method and apparatus for tracking speculative accesses that cause prefetches and/or pollutions.

SUMMARY OF THE INVENTION

The present invention provides a method and structure for equipping a cache with information to enable the processor to track and report whether a given speculative access causes prefetches and/or pollutions of the cache.

According to one embodiment of the present invention, an additional bit line on the cache address bus is provided that is used to indicate whether an access is a speculative access or not.

In addition, according to one embodiment of the present invention, the system processor is modified to allow the processor to determine/label different accesses as speculative. In one embodiment of the invention, this modification is programmable and is accomplished by providing the processor with a register that indicates what constitutes a speculative instruction. For example, speculative instructions could be prefetches, wrong path loads, or scouting instructions. In addition, since the specific implementation generally determines the interference between speculative and non-speculative accesses, according to one embodiment of the present invention, the program is allowed to decide a range of addresses that should be deemed as speculative. In this embodiment, the processor is allowed to report how the range of addresses interferes with the rest of the address space.

According to one embodiment of the present invention, called herein a global prefetch counting embodiment, a processor includes a programmable prefetch counter that can be set. According to one global prefetch counting embodiment of the invention, a single additional bit per tag is added that is called the S-bit. According to one global prefetch counting embodiment of the invention, the S-bit indicates whether the cache line was accessed speculative or not.

According to one global prefetch counting embodiment of the invention, a prefetch counter counts the number of prefetches and instructions are provided to read and clear the prefetch counter as needed. In addition, According to one global prefetch counting embodiment of the invention, the processor has the ability to trap, either on a counter overflow or count of zero.

Those of skill in the art will readily recognize that the requirement, according to one global prefetch counting embodiment of the invention, of a prefetch counter, instructions to read and clear the prefetch counter as needed and the ability to trap on either a counter overflow or count of zero can often be provided by using existing performance instrumentation counter infrastructure with a new counter event type According to one global prefetch counting embodiment of the invention, a speculative insert, i.e., a cache line that was not originally in the cache but is accessed speculatively and is now inserted into the cache, causes the S-bit of the cache line to be set.

According to one global prefetch counting embodiment of the invention, a speculative update, i.e., a cache line that was accessed speculatively and found to be in the cache and has its replacement ordering updated, results in the setting of the S-bit of the updated cache line.

According to one global prefetch counting embodiment of the invention, a speculative miss, i.e., a cache line accessed speculatively that misses in the cache, is not changed.

According to one global prefetch counting embodiment of the invention, a non-speculative insert, i.e., a cache line that was accessed non-speculatively and was not in the cache that is now inserted into the cache, results in the S-bit of the inserted cache line being cleared.

According to one global prefetch counting embodiment of the invention, a non-speculative update, i.e., a cache line that was accessed non-speculatively and found to be in the cache that has its replacement ordering updated, results in incrementing the global prefetch count and the clearing of the S-bit if the updated cache line S-bit is set.

According to one global prefetch counting embodiment of the invention, a non-speculative miss, i.e., a cache line accessed non-speculatively that misses in the cache, results in no change.

According to one embodiment of the present invention, hereinafter called a per instruction address prefetch counting embodiment of the invention, a processor includes a programmable prefetch counter that can be set and a table to hold instruction addresses called an instruction address table (IAT). According to one per instruction address prefetch counting embodiment of the invention, a sample-based approach is used in which each prefetch that occurs decrements the prefetch counter and, when the prefetch counter reaches zero, a trap occurs and a sample is taken from the prefetch occurrence that causes the trap. Of course, those of skill in the art will readily recognize that an up counter could also be used with a trap set to occur at a specific count of overflow value.

According to one per instruction address prefetch counting embodiment of the invention, one speculative instruction address is stored per cache set. If multiple speculative accesses affect a single cache set at the same time, then, according to one per instruction address prefetch counting embodiment of the invention, the per instruction address information is gathered and attributed only for the latest speculative access that occurred. In this event, according to one per instruction address prefetch counting embodiment of the invention, the earlier speculative accesses will not be attributable to a specific instruction address. According to one per instruction address prefetch counting embodiment of the invention, it is possible to store less than one instruction address per cache set. For example, one instruction address per two cache sets, however, the calculation then limits the number of speculative accesses that can occur in the combined sets.

According to one per instruction address prefetch counting embodiment of the invention, the instruction address of a prefetched instruction is stored in the IAT.

According to one per instruction address prefetch counting embodiment of the invention, a speculative insert, i.e., a cache line that was not originally in the cache but is accessed speculatively and is now inserted into the cache, causes the S-bit of the cache line to be set.

According to one per instruction address prefetch counting embodiment of the invention, a speculative update, i.e., a cache line that that was accessed speculatively and found to be in the cache, and has its replacement ordering updated, results in the setting of the S-bit of the updated cache line.

According to one per instruction address prefetch counting embodiment of the invention, a speculative miss, i.e., a cache line accessed speculatively that misses in the cache, is not changed.

According to one per instruction address prefetch counting embodiment of the invention, a non-speculative insert, i.e., a cache line that was accessed non-speculatively and was not in the cache that is now inserted into the cache, results in the S-bit of the inserted cache line being cleared.

According to one per instruction address prefetch counting embodiment of the invention, in the event of a non-speculative update, i.e., a cache line that was accessed non-speculatively and found to be in the cache that has its replacement ordering updated, results in incrementing the global prefetch count and the clearing of the S-bit if the updated cache line S-bit is set and the counter is decremented (or incremented). If the prefetch counter reaches zero (or the specified overflow value) then, according to one per instruction address prefetch counting embodiment of the invention, if the present instruction caused the zero count (overflow), a trap is initiated and the address of the instruction that caused the trap is supplied from the IAT. In addition, according to one per instruction address prefetch counting embodiment of the invention, the data address of the prefetched cache line is supplied According to one per instruction address prefetch counting embodiment of the invention, a non-speculative miss, i.e., a cache line accessed non-speculatively that misses in the cache, results in no change.

According to one embodiment of the invention, hereinafter referred to as global pollution counting embodiment, additional tag information is stored and tracked relating to which cache lines would be in the cache if no speculative accesses had occurred. Since it is theoretically possible that each cache line be speculative, a fully accurate pollution count potentially requires a replication of the tags structure for the cache. However, since replicating the tags is prohibitively expensive, according to one embodiment of the invention, only one extra tag per cache set is used. This allows the tracking of, at most, one speculative access per cache set at a time. If multiple speculative accesses are in a single set at one time, then, using this one embodiment of the invention, the information gathered will not be incorrect, but merely a subset of the actual pollution information.

According to one embodiment of a global pollution counting system of the invention, pollution counting is built on top of the global prefetch counting embodiment discussed above. Consequently, it is assumed that all of the modifications and hardware for global prefetch counting are already implemented.

In addition to the modifications and hardware for global prefetch counting discussed above, one embodiment of a global pollution counting system of the invention further requires an additional bit per tag called the A-bit. According to one embodiment of a global pollution counting system of the invention, the A-bit indicates whether or not the cache line was affected by a speculative access or not. Herein, the term "affected" indicates that the replacement ordering (e.g., LRU, pseudo-LRU, etc.) of the cache line was changed by a speculative access;

In addition to the modifications and hardware for global prefetch counting discussed above, one embodiment of a global pollution counting system of the invention further requires a table, the evicted tag table (ETT), containing one tag entry per cache set. According to one embodiment of a global pollution counting system of the invention, the ETT entry is used to store the most recently evicted cache line in the case that it was evicted because a speculative access occurred. In one embodiment, the ETT is made part of the cache tag structure.

In addition to the modifications and hardware for global prefetch counting discussed above, one embodiment of a global pollution counting system of the invention further requires: a pollution counter to count the number of pollutions; instruction(s) to read/clear the pollution counter; and ability to trap on pollution counter overflow. Those of skill in the art will readily recognize that the pollution counter, instruction(s) to read/clear the pollution counter, and ability to trap on pollution counter overflow can be often provided by using existing performance instrumentation counter infrastructure with a new counter event type.

According to one global pollution counting embodiment of the invention, a speculative insert, i.e., a cache line that was not originally in the cache but is accessed speculatively and is now inserted into the cache, causes the S-bit of the cache line to be set and the A-bit to be set of all other cache lines that do not have their S-bits set. In addition, the tag of the evicted cache line is moved to the ETT entry for this set.

According to one global pollution counting embodiment of the invention a speculative update, i.e., a cache line that that was accessed speculatively and found to be in the cache and has its replacement ordering updated, results in the setting of the S-bit of the updated cache line. In addition, if this access modifies the replacement ordering of the cache set, then the A-bit of all cache lines that had their replacement ordering modified (i.e., before the access, they were going to be replaced after the updated cache line, now, they will be replaced before the updated cache line) is set and their S-bit is made equal to zero.

According to one global pollution counting embodiment of the invention, a speculative miss, i.e., a cache line accessed speculatively that misses in the cache, results in no change.

According to one global pollution counting embodiment of the invention, a non-speculative insert, i.e., a cache line that was accessed non-speculatively and was not in the cache that is now inserted into the cache, results in the S-bit of the inserted cache line being cleared and if the evicted entry has the A-bit set, then the tag of the evicted cache line is moved to the ETT entry for this cache set.

According to one global pollution counting embodiment of the invention, in the event of a non-speculative update, i.e., a cache line that was accessed non-speculatively and found to be in the cache, and that has its replacement ordering updated, results in incrementing the global prefetch count and the clearing of the S-bit, if the updated cache line S-bit is set, and clearing of the A-bit of all other cache lines, and invalidating the ETT entry for this cache set.

According to one global pollution counting embodiment of the invention, in the event of a non-speculative miss, i.e., a cache line accessed non-speculatively that misses in the cache, if the ETT entry for this set is valid and equals the tag of the accessed cache line, then the global pollution count is incremented and the ETT entry for this cache set is cleared.

Another embodiment of the invention, hereinafter referred to as per instruction address pollution counting system embodiment, is built upon the per instruction address prefetch counting embodiment of the invention discussed above. Consequently, according to one embodiment of a per instruction address pollution counting system of the invention, it is assumed that all of the modifications and hardware for per instruction address prefetch counting are already implemented. In addition, one embodiment of per instruction address pollution counting of the invention is also built on the global pollution counting embodiment of the invention and therefore it is also assumed that all of the modifications and hardware for global pollution counting are already implemented. Consequently, it is assumed that the following modifications are present:

The S-bit (can use the same S-bit from global prefetch counting discussed above);

The A-bit (can use the same A-bit from global pollution counting discussed above);

The ETT (can use the same ETT from global pollution counting discussed above);

The IAT (can use the same IAT from per instruction address prefetch counting discussed above).

In addition to the modifications and hardware for per instruction address prefetch counting and global pollution counting discussed above, one embodiment of a per instruction address pollution counting system of the invention further requires a programmable pollution counter (just like the prefetch counter discussed above for per instruction address prefetch counting) and the ability to trap on a pollution occurrence, as well as a method for reading the pollution information on a trap.

According to one per instruction address pollution counting embodiment of the invention, a speculative insert, i.e., a cache line that was not originally in the cache but is accessed speculatively and is now inserted into the cache, causes the S-bit of the cache line to be set and the A-bit to be set of all other cache lines that do not have their S-bits set.

According to one per instruction address pollution counting embodiment of the invention, a speculative update, i.e., a cache line that was accessed speculatively and found to be in the cache and has its replacement ordering updated, results in the setting of the S-bit of the updated cache line. In addition, if this access modifies the replacement ordering of the cache set, then the A-bit of all cache lines that had their replacement ordering modified (i.e., before the access, they were going to be replaced after the updated cache line, now, they will be replaced before the updated cache line) is set and their S-bit is made equal to zero.

According to one per instruction address pollution counting embodiment of the invention, a speculative miss, i.e., a cache line accessed speculatively that misses in the cache, results in no change.

According to one per instruction address pollution counting embodiment of the invention, a non-speculative insert, i.e., a cache line that was accessed non-speculatively and was not in the cache that is now inserted into the cache, results in the S-bit of the inserted cache line being cleared and if the evicted entry has the A-bit set, then the tag of the evicted cache line is moved to the ETT entry for this cache set.

According to one per instruction address pollution counting embodiment of the invention, in the event of a non-speculative update, i.e., a cache line that was accessed non-speculatively and found to be in the cache that has its replacement ordering updated, results in incrementing the global prefetch count and the clearing of the S-bit if the updated cache line S-bit is set and the counter is decremented (or incremented) and clearing of the A-bit of all other cache lines, and invalidating the ETT entry for this cache set. If the pollution counter reaches zero (or the specified overflow value) then, according to one per instruction address pollution counting embodiment of the invention, if the present instruction caused the zero count (overflow) a trap is initiated and the address of the instruction that caused the trap is supplied from the IAT. In addition, according to one per instruction address pollution counting embodiment of the invention, the data address of the prefetched cache line is supplied.

According to one per instruction address pollution counting embodiment of the invention, in the event of a non-speculative miss, i.e., a cache line accessed non-speculatively that misses in the cache, if the ETT entry for the set matches the tag of the accessed cache line, the programmable pollution counter is decremented. If pollution counter reaches zero, then a trap is initiated. Like per instruction address prefetch counting, the processor then supplies the instruction address of the speculative access that caused the pollution to occur. If there were multiple speculative accesses per cache set, then the latest speculative access will be attributed for the pollution. The processor can retrieve this from the IAT. The processor can also construct and supply the memory address of the polluted cache line from the ETT.

As discussed briefly above and in more detail below, the method and apparatus of the invention provides the cache with information to enable the processor to track and report whether a given speculative access causes prefetches and/or pollutions of the cache. Consequently, the problems created by speculative accesses to cache lines that will not be used can be avoided.

It is to be understood that both the foregoing general description and following detailed description are intended only to exemplify and explain the invention as claimed.

BRIEF DESCRIPTION OF THE DRAWINGS

The accompanying drawings, which are incorporated in, and constitute a part of this specification, illustrate embodiments of the invention and, together with the description, serve to explain the advantages and principles of the invention. In the drawings.

DETAILED DESCRIPTION

Figure 1:
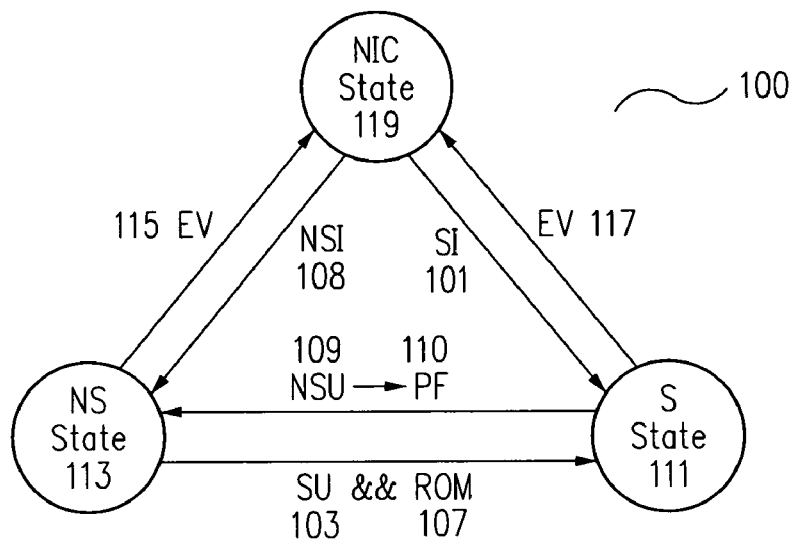
FIG. 1 shows a flow diagram of a global prefetch counting system in accordance with one embodiment of the present invention.

The invention will now be described in reference to the accompanying drawings. The same or similar reference numbers may be used throughout the drawings and the following description to refer to the same or like parts.

As discussed above, the present invention provides a method and structure for equipping a cache with information to enable the processor to track and report whether a given speculative access causes prefetches and/or pollutions of the cache. According to the present invention, this is accomplished by tracking two types of events in two different ways: first by counting/tracking prefetch operations, either globally or on a per instruction address basis and then by counting/tracking pollutions, either globally or on a per instruction address basis.

To simplify the following discussion, various embodiments of portions of the invention will be discussed separately below. However, those of skill in the art will readily recognize that the portions discussed separately can be, and are in many cases intended to be, used in combination in a single system employing the present invention.

In the following pages a method and structure for global prefetch counting according to the invention is discussed and then a method and structure for per instruction address prefetch counting is discussed. The discussion of prefetch counting systems is followed by an introduction to a global pollution counting method and structure according to the present invention and then an introduction to a per instruction address pollution counting method and structure is provided. Finally, one embodiment of hardware based speculative access optimization is briefly discussed as well as compiler-based prefetch tuning and compiler-based layout optimization.

Common System Requirements

The following requirements are necessary for all of the prefetch and pollution counting embodiments of the invention discussed below.

According to one embodiment of the present invention, an additional bit line on the cache address bus is provided that is used to indicate whether an access is a speculative access or not.

Those of skill in the art will readily recognize that the addition of a bit line can be accomplished by various hardware modifications and/or by using any one of several well-know methods and/or devices. Consequently, a more detailed discussion of these methods and structures is omitted here to avoid detracting from the present invention.

In addition, according to one embodiment of the present invention, the system processor is modified to allow the processor to determine/label different accesses as speculative. In one embodiment of the invention, this modification is programmable and is accomplished by providing the processor with a register that indicates what constitutes a speculative instruction. For example, speculative instructions could be prefetches, wrong path loads, or scouting instructions. In addition, since the specific implementation generally determines the interference between speculative and non-speculative accesses, according to one embodiment of the present invention, the program is allowed to decide a range of addresses that should be deemed as speculative. In this embodiment, the processor is allowed to report how the range of addresses interferes with the rest of the address space.

Those of skill in the art will readily recognize that the modifications to the system processor to allow the processor to determine/label different accesses as speculative can be accomplished by various hardware modifications and/or by using any one of several well-known methods and/or devices. Consequently, a more detailed discussion of these methods and structures is omitted here to avoid detracting from the present invention.

Global Prefetch Counting

According to one embodiment of a global prefetch counting system of the invention, a processor includes a programmable prefetch counter that can be set. According to one global prefetch counting embodiment of the invention, a single additional bit per tag is added that is called the S-bit. According to one global prefetch counting embodiment of the invention, the S-bit indicates whether the cache line was accessed speculative or not.

According to one global prefetch counting embodiment of the invention, a prefetch counter counts the number of prefetches and instructions are provided to read and clear the prefetch counter as needed. In addition, according to one global prefetch counting embodiment of the invention, the processor has the ability to trap, on either a counter overflow or count of zero.

Those of skill in the art will readily recognize that the additional hardware requirements discussed above, including the prefetch counter and its operation, can be met by various hardware modifications and/or by using any one of several well-know methods and/or devices. Consequently, a more detailed discussion of these methods and structures is omitted here to avoid detracting from the present invention.

Those of skill in the art will also readily recognize that the requirement, according to one global prefetch counting embodiment of the invention, of a prefetch counter, instructions to read and clear the prefetch counter as needed and the ability to trap on either a counter overflow or count of zero can often be provided by using existing performance instrumentation counter infrastructure with a new counter event type.

FIG. 1 shows a flow diagram of global prefetch counting system 100 in accordance with one embodiment of the present invention. As seen in FIG. 1, according to one global prefetch counting embodiment of the invention, a speculative insert SI 101, i.e., a cache line that was not originally in the cache but is accessed speculatively and is now inserted into the cache, causes the S-bit of the cache line to be set, thereby changing the state of the cache line to the speculative state S-state 111.

According to one global prefetch counting embodiment of the invention, a speculative update SU 103, i.e., a cache line that that was accessed speculatively and found to be in the cache and that has its replacement ordering updated ROM 107, also results in the setting of the S-bit of the updated cache line at and the state of the cache line to be changed to the speculative state S-state 111.

According to one global prefetch counting embodiment of the invention, a speculative miss SM (not shown in FIG. 1), i.e., a cache line accessed speculatively that misses in the cache, results in no change.

According to one global prefetch counting embodiment of the invention, a non-speculative insert NSI 108, i.e., a cache line that was accessed non-speculatively and was not in the cache that is now inserted into the cache, results in the S-bit of the inserted cache line being cleared and the state of the cache line to be changed to the non-speculative state NS-state 113.

According to one global prefetch counting embodiment of the invention, in the event of a non-speculative update NSU 109, i.e., a cache line that was accessed non-speculatively and found to be in the cache that has its replacement ordering updated, results in incrementing the global prefetch count PF 110 if the updated cache line S-bit is set and the clearing of the S-bit of the cache line to the NS-state 113.

According to one global prefetch counting embodiment of the invention, a non-speculative miss NSM (not shown in FIG. 1), i.e., a cache line accessed non-speculatively that misses in the cache, results in no change.

According to one global prefetch counting embodiment of the invention, an eviction EV 115 results in a change of state from the non-speculative state NS 113 to the not in cache state NIC state 119.

According to one global prefetch counting embodiment of the invention, an eviction EV 117 results in a change of state from the speculative state S-state 111 to the not in cache state NIC state 119.

Per Instruction Prefetch Counting

According to one embodiment of a per instruction address prefetch counting system of the invention, a processor includes a programmable prefetch counter that can be set and a table to hold instruction addresses called an instruction address table (IAT). According to one per instruction address prefetch counting embodiment of the invention, a sample-based approach is used in which each prefetch that occurs decrements the prefetch counter and, when the prefetch counter reaches zero, a trap occurs and a sample is taken from the prefetch occurrence that causes the trap. Of course, those of skill in the art will readily recognize that an up counter could also be used with a trap set to occur at a specific count of overflow value.

Those of skill in the art will readily recognize that the additional hardware requirements discussed above, including the IAT and its operation, can be met by various hardware modifications and/or by using any one of several well-know methods and/or devices. Consequently, a more detailed discussion of these methods and structures is omitted here to avoid detracting from the present invention.

According to one per instruction address prefetch counting embodiment of the invention, one speculative instruction address is stored per cache set. If multiple speculative accesses affect a single cache set at the same time, then, according to one per instruction address prefetch counting embodiment of the invention, the per instruction address information is gathered and attributed only for the latest speculative access that occurred. In this event, according to one per instruction address prefetch counting embodiment of the invention, the earlier speculative accesses will not be attributable to a specific instruction address. According to one per instruction address prefetch counting embodiment of the invention, it is possible to store less than one instruction address per cache set. For example, one instruction address per two cache sets, however, the calculation then limits the number of speculative accesses that can occur in the combined sets.

Those of skill in the art will readily recognize that the additional hardware requirements discussed above can be met by various hardware modifications and/or by using any one of several well-know methods and/or devices. Consequently, a more detailed discussion of these methods and structures is omitted here to avoid detracting from the present invention.

According to one per instruction address prefetch counting embodiment of the invention, the instruction address of a prefetched instruction is stored in the IAT.

Figure 2:
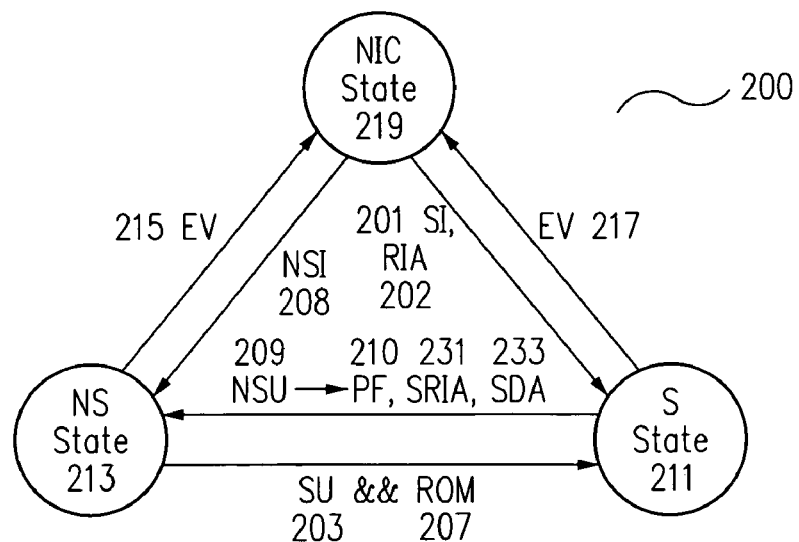
FIG. 2 shows a flow diagram of a per instruction address prefetch counting system in accordance with one embodiment of the present invention.

FIG. 2 shows a flow diagram of a per instruction address prefetch counting system 200 in accordance with one embodiment of the present invention. As seen in FIG. 2, a speculative insert SI 201, i.e., a cache line that was not originally in the cache but is accessed speculatively and is now inserted into the cache, causes the S-bit of the cache line to be set, thereby changing the state of the cache line to the speculative state S-state 211, and the address is stored or remembered at RIA 202.

According to one per instruction address prefetch counting embodiment of the invention, a speculative update SU 203, i.e., a cache line that was accessed speculatively and found to be in the cache and has its replacement ordering updated ROM 207, results in the setting of the S-bit of the updated cache line, thereby changing the state of the cache line to the speculative state S-state 211.

According to one per instruction address prefetch counting embodiment of the invention, a speculative miss (not shown in FIG. 2), i.e., a cache line accessed speculatively that misses in the cache, results in no change.

According to one per instruction address prefetch counting embodiment of the invention, a non-speculative insert NSI 208, i.e., a cache line that was accessed non-speculatively and was not in the cache that is now inserted into the cache, results in the S-bit of the inserted cache line being cleared, thereby changing the state of the cache line to the non-speculative state NS-state 213.

According to one per instruction address prefetch counting embodiment of the invention, a non-speculative update NSU 209, i.e., a cache line that was accessed non-speculatively and found to be in the cache that has its replacement ordering updated, results in incrementing the global prefetch count PF 210 and the clearing of the S-bit if the updated cache line S-bit is set and the counter is decremented (or incremented). If the prefetch counter reaches zero (or the specified overflow value) then, according to one per instruction address prefetch counting embodiment of the invention, if the present instruction caused the zero count (overflow) a trap is initiated and the address of the instruction that caused the trap is supplied from the IAT at SRIA 231. In addition, according to one per instruction address prefetch counting embodiment of the invention, the data address of the prefetched cache line is supplied at SDA 233.

According to one per instruction address prefetch counting embodiment of the invention, a non-speculative miss (not shown in FIG. 2), i.e., a cache line accessed non-speculatively that misses in the cache, results in no change.

According to one per instruction address prefetch counting embodiment of the invention, an eviction EV 215 results in a change of state from the non-speculative state NS 213 to the not in cache state NIC state 219.

According to one per instruction address prefetch counting embodiment of the invention, an eviction EV 217 results in a change of state from the speculative state S-state 211 to the not in cache state NIC state 219.

Global Pollution Counting

According to one embodiment of a global pollution counting system of the invention, additional tag information is stored and tracked relating to which cache lines would be in the cache if no speculative accesses had occurred. Since it is theoretically possible that each cache line be speculative, a fully accurate pollution count potentially requires a replication of the tags structure for the cache. However, since replicating the tags is prohibitively expensive, according to one embodiment of the invention, only one extra tag per cache set is used. This allows the tracking of at most one speculative access per cache set at a time. If multiple speculative accesses are in a single set at one time, then, using this one embodiment of the invention, the information gathered will not be incorrect, but merely a subset of the actual pollution information.

According to one embodiment of a global pollution counting system of the invention, pollution counting is built on top of the global prefetch counting embodiment discussed above. Consequently, it is assumed that all of the modifications and hardware for global prefetch counting are already implemented.

Those of skill in the art will readily recognize that the additional hardware requirements discussed above can be met by various hardware modifications and by using any one of several well-know methods and/or devices. Consequently, a more detailed discussion of these methods and structures is omitted here to avoid detracting from the present invention.

In addition to the modifications and hardware for global prefetch counting discussed above, one embodiment of a global pollution counting system of the invention further requires an additional bit per tag called the A-bit. According to one embodiment of a global pollution counting system of the invention, the A-bit indicates whether or not the cache line was affected by a speculative access or not. Herein, the term "affected" indicates that the replacement ordering (e.g., LRU, pseudo-LRU, etc.) of the cache line was changed by a speculative access.

Those of skill in the art will readily recognize that the additional hardware requirements discussed above can be met by various hardware modifications and by using any one of several well-know methods and/or devices. Consequently, a more detailed discussion of these methods and structures is omitted here to avoid detracting from the present invention.

In addition to the modifications and hardware for global prefetch counting discussed above, one embodiment of a global pollution counting system of the invention further requires a table, the evicted tag table (ETT), containing one tag entry per cache set. According to one embodiment of a global pollution counting system of the invention, the ETT entry is used to store a portion of the address of the most recently evicted cache line in the case that it was evicted because a speculative access occurred. In one embodiment, the ETT is made part of the cache tag structure.

In addition to the modifications and hardware for global prefetch counting discussed above, one embodiment of a global pollution counting system of the invention further requires: a pollution counter to count the number of pollutions; instruction(s) to read/clear the pollution counter; and ability to trap on pollution counter overflow. Those of skill in the art will readily recognize that the pollution counter, instruction(s) to read/clear the pollution counter, and ability to trap on pollution counter overflow can be often provided by using existing performance instrumentation counter infrastructure with a new counter event type.

Figure 3:
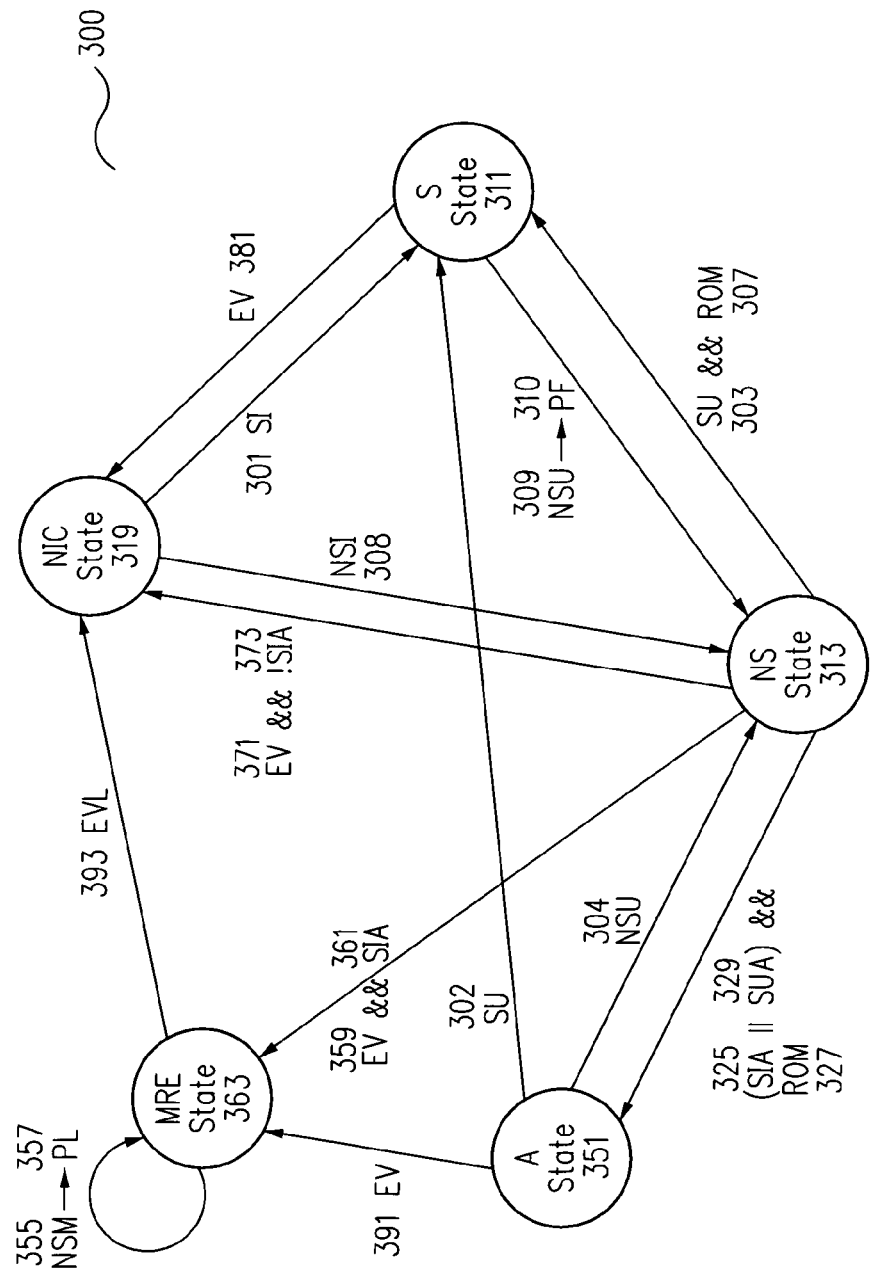
FIG. 3 shows a flow diagram of a global pollution counting system in accordance with one embodiment of the present invention.

FIG. 3 shows a flow diagram of global pollution counting system 300 in accordance with one embodiment of the present invention. As seen in FIG. 3, according to one global pollution counting embodiment of the invention, a speculative insert SI 301, i.e., a cache line that was not originally in the cache but is accessed speculatively and is now inserted into the cache, causes the S-bit of the cache line to be set, thereby changing the state of the cache line to the speculative state S-state 311 and the A-bit to be set of all other cache lines that do not have their S-bits set, thereby changing the state of all other cache lines that do not have their S-bits set to A-state 351. In addition, the tag of the evicted cache line is moved to the ETT entry for this set.

According to one global pollution counting embodiment of the invention a speculative update SU 302 results in the change of state from the A-state 351 to the speculative state S-state 311, state MRE 363.

According to one global pollution counting embodiment of the invention a speculative update SU 303, i.e., a cache line that that was accessed speculatively and found to be in the cache, and has its replacement ordering updated ROM 307, results in the setting of the S-bit of the updated cache line, thereby changing the state of the cache line from the non-speculative state NS-state 313 to the speculative state S-state 311. In addition, if this access modifies the replacement ordering of the cache set ROM 307, then the A-bits of all cache lines that had their replacement ordering modified (i.e., before the access, they were going to be replaced after the updated cache line, now, they will be replaced before the updated cache line) are set and their S-bits are set to zero.

According to one global pollution counting embodiment of the invention, a speculative miss (not shown in FIG. 3), i.e., a cache line accessed speculatively that misses in the cache, results in no change.

According to one global pollution counting embodiment of the invention, a non-speculative insert NSI 308, i.e., a cache line that was accessed non-speculatively and was not in the cache that is now inserted into the cache, results in the S-bit of the inserted cache line being cleared and the state of the cache line being set to the non-speculative state NS-state 313, and, if the evicted entry has the A-bit set, then the tag of the evicted cache line is moved to the ETT entry for this cache set, state MRE 363.

According to one global pollution counting embodiment of the invention, in the event of a non-speculative update NSU 309, i.e., a cache line that was accessed non-speculatively and found to be in the cache that has its replacement ordering updated, results in: incrementing the global prefetch count PF 310 if the updated cache line S-bit is set and the clearing of the S-bit, thereby changing the state of the cache line to the non-speculative state NS-state 313; clearing of the A-bit of all other cache lines, thereby changing the state of all other cache lines to the non-speculative state NS-state 313; and invalidating the ETT entry for this cache set.

According to one global pollution counting embodiment of the invention, in the event of a non-speculative update NSU 304, i.e., a cache line that was accessed non-speculatively and found to be in the cache that has its replacement ordering updated, results in a change of state from the A-state 351 to the non-speculative state NS-state 313.

According to one global pollution counting embodiment of the invention, in the event of a non-speculative miss NSM 355, i.e., a cache line accessed non-speculatively that misses in the cache, if the ETT entry for this set is valid and equals the tag of the accessed cache line, then the global pollution count is incremented PL 357 and the ETT entry for this cache set is cleared.

According to one global pollution counting embodiment of the invention, an eviction EV 359 combined with a speculative access to another line SIA 361 results in a change of state from the non-speculative state NS 313 to the most recently evicted line state MRE state 363.

According to one global pollution counting embodiment of the invention, an eviction EV 371 that is not combined with a non-speculative access to another line SIA 373 results in a change of state from the non-speculative state NS 313 to the not in cache state NIC state 319.

According to one global pollution counting embodiment of the invention, an eviction EV 381 results in a change of state from the speculative state S-state 311 to the not in cache state NIC 319.

According to one global pollution counting embodiment of the invention, an eviction EV 391 results in a change of state from the A-state 351 to the most recently evicted line state MRE state 363.

According to one global pollution counting embodiment of the invention, the eviction EVL 393 of another cache line in the cache set results in a change of state from the most recently evicted line state MRE state 363 to the not in cache state NIC state 319.

According to one global pollution counting embodiment of the invention, a speculative access to another line in a cache set SIA 325, or a speculative update to another line in a cache set SUA 329, combined with a replacement ordering ROM 327, results in a change of state from the non-speculative state NS 313 to the A-state 351.

Per Instruction Address Pollution Counting

Another embodiment of the invention, hereinafter referred to as per instruction address pollution counting system, is built upon the per instruction address prefetch counting embodiment of the invention discussed above. Consequently, according to one embodiment of a per instruction address pollution counting system of the invention, it is assumed that all of the modifications and hardware for per instruction address prefetch counting are already implemented. In addition, one embodiment of per instruction address pollution counting of the invention is also built on the global pollution counting embodiment of the invention and therefore it is assumed that all of the modifications and hardware for global pollution counting are also already implemented. Consequently, it is assumed that the following modifications are present:

The S-bit (can use the same S-bit from global prefetch counting discussed above);

The A-bit (can use the same A-bit from global pollution counting discussed above);

The ETT (can use the same ETT from global pollution counting discussed above);

The IAT (can use the same IAT from per instruction address prefetch counting discussed above).

In addition to the modifications and hardware for per instruction address prefetch counting and global pollution counting discussed above, one embodiment of a per instruction address pollution counting system of the invention further requires a programmable pollution counter (just like the counter discussed above for per instruction address prefetch counting) and the ability to trap on a pollution occurrence, as well as a method for reading the pollution information on a trap.

Those of skill in the art will readily recognize that the additional hardware requirements discussed above can be met by various hardware modifications and by using any one of several well-know methods and/or devices. Consequently, a more detailed discussion of these methods and structures is omitted here to avoid detracting from the present invention.

Figure 4:
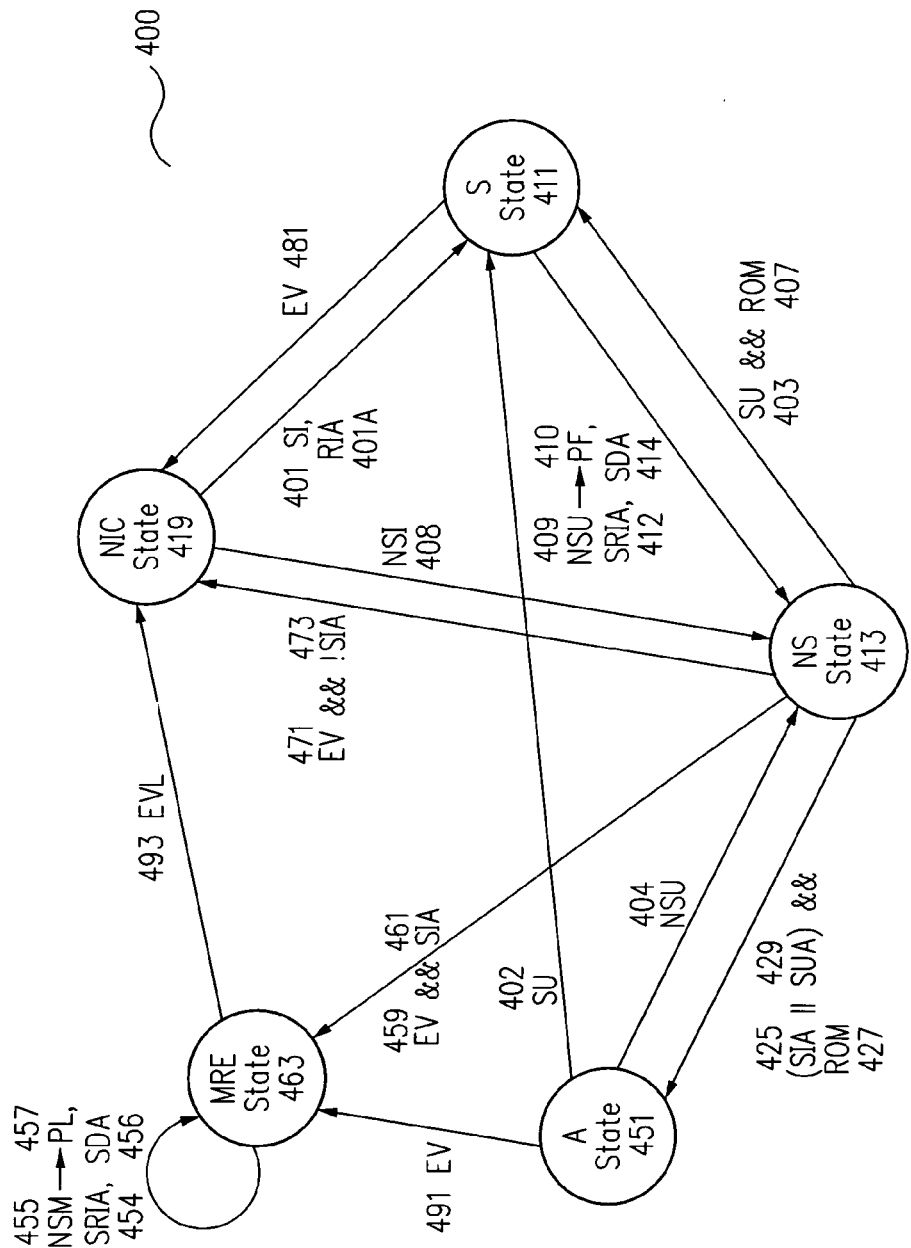
FIG. 4 shows a flow diagram of a per instruction address pollution counting system in accordance with one embodiment of the present invention.

FIG. 4 shows a flow diagram of a per instruction address pollution counting system 400 in accordance with one embodiment of the present invention. As seen in FIG. 4, according to one per instruction address pollution counting embodiment of the invention, a speculative insert SI 401, i.e., a cache line that was not originally in the cache but is accessed speculatively and is now inserted into the cache, causes the S-bit of the cache line to be set, thereby changing the state of the cache line to the speculative state S-state 411 and the A-bit to be set of all other cache lines that do not have their S-bits set, thereby changing the state of all other cache lines that do not have their S-bits set to A-state 451. In addition, the tag of the evicted cache line is moved to the ETT entry for this set, MRE state 463 and the instruction address is stored at RIA 401A.

According to one per instruction address pollution counting embodiment of the invention, a speculative update SU 402 results in the change of state from the A-state 451 to the speculative state S-state 411.

According to one per instruction address pollution counting embodiment of the invention a speculative update SU 403, i.e., a cache line that that was accessed speculatively and found to be in the cache and has its replacement ordering modified ROM 407, results in the setting of the S-bit of the updated cache line, thereby changing the state of the cache line from the non-speculative state NS-state 413 to the speculative state S-state 411. In addition, if this access modifies the replacement ordering of the cache set ROM 407, then the A-bits of all cache lines that had their replacement ordering modified (i.e., before the access, they were going to be replaced after the updated cache line, now, they will be replaced before the updated cache line) are set and their S-bits are set to zero.

According to one per instruction address pollution counting embodiment of the invention, a speculative miss (not shown in FIG. 4), i.e., a cache line accessed speculatively that misses in the cache, results in no change.

According to one per instruction address pollution counting embodiment of the invention, a non-speculative insert NSI 408, i.e., a cache line that was accessed non-speculatively and was not in the cache that is now inserted into the cache, results in the S-bit of the inserted cache line being cleared, thereby changing the state of the cache line to the non-speculative state NS-state 413, and if the evicted entry has the A-bit set, then the tag of the evicted cache line is moved to the ETT entry for this cache set, MRE state 463.

According to one per instruction address pollution counting embodiment of the invention, in the event of a non-speculative update NSU 409, i.e., a cache line that was accessed non-speculatively and found to be in the cache that has its replacement ordering modified, results in: incrementing the global prefetch count PF 410 if the updated cache line S-bit is set; clearing of the S-bit, thereby changing the state of the cache line to the non-speculative state NS-state 413; clearing of the A-bit of all other cache lines in the cache set, thereby changing the state of all other cache lines in the cache set to the non-speculative state NS-state 413; and invalidating the ETT entry for this cache set. In addition, the instruction address is supplied SRIA 412 and the data address are supplied SDA 414.

According to one per instruction address pollution counting embodiment of the invention, in the event of a non-speculative update NSU 404, i.e., a cache line that was accessed non-speculatively and found to be in the cache that has its replacement ordering modified, results in a change of state from the A-state to the non-speculative state NS-state 413.

According to one per instruction address pollution counting embodiment of the invention, in the event of a non-speculative miss NSM 455, i.e., a cache line accessed non-speculatively that misses in the cache, if the ETT entry for this set is valid and equals the tag of the accessed cache line, then the global pollution count is incremented PL 457 and the ETT entry for this cache set is cleared, the instruction address is supplied SRIA 454 and the data address is supplied SDA 456.

According to one per instruction address pollution counting embodiment of the invention, an eviction EV 459 combined with a speculative access to another line SIA 461 results in a change of state from the non-speculative state NS 413 to the most recently evicted line state MRE state 463.

According to one per instruction address pollution counting embodiment of the invention, an eviction EV 471 that is combined with a non-speculative access to another line SIA 473 results in a change of state from the non-speculative state NS 413 to the not in cache state NIC state 419.

According to one per instruction address pollution counting embodiment of the invention, an eviction EV 481 results in a change of state from the speculative state S-state 411 to the not in cache state NIC 419.

According to one per instruction address pollution counting embodiment of the invention, an eviction EV 491 results in a change of state from the A-state 451 to the most recently evicted line state MRE state 463.

According to one per instruction address pollution counting embodiment of the invention, the eviction EVL 494 of another cache line in the cache set results in a change of state from the most recently evicted line state MRE state 464 to the not in cache state NIC state 419.

According to one per instruction address pollution counting embodiment of the invention, a speculative access to another line in a cache set SIA 425, or a speculative update to another line in a cache set SUA 429, combined with a replacement ordering update ROM 427, results in a change of state from the non-speculative state NS 414 to the A-state 451.

As discussed above, the method and apparatus of the invention provides the cache with information to enable the processor to track and report whether a given speculative access causes prefetches and/or pollutions of the cache. Consequently, the problems created by speculative accesses to cache lines that will not be used can be avoided.

In addition, as discussed above, the present invention can be employed with minimum alteration to the system architecture and by using components and methods well known to those of skill in the art to make the necessary modifications. Consequently, the present invention meets a long-standing industry need with minimal system modification.

Hardware-Based Speculative Access Omptimization

One embodiment of a global pollution counting system of the invention includes a hardware-based speculative access optimization. As discussed above, according to one embodiment of a global pollution counting system of the invention, pollution counting is built on top of the global prefetch counting embodiment discussed above. Consequently, it is assumed that all of the modifications and hardware for global prefetch counting are already implemented.

As also discussed above, in addition to the modifications and hardware for global prefetch counting discussed above, one embodiment of a global pollution counting system of the invention further requires an additional bit per tag called the A-bit. According to one embodiment of a global pollution counting system of the invention, the A-bit indicates whether or not the cache line was affected by a speculative access or not. Herein, the term "affected" indicates that the replacement ordering (e.g., LRU, pseudo-LRU, etc.) of the cache line was changed by a speculative access;

As discussed above, in addition to the modifications and hardware for global prefetch counting discussed above, one embodiment of a global pollution counting system of the invention further requires a table, the evicted tag table (ETT), containing one tag entry per cache set. According to one embodiment of a global pollution counting system of the invention, the ETT entry is used to store the most recently evicted cache line in the case that it was evicted because a speculative access occurred. In one embodiment, the ETT is made part of the cache tag structure.

As discussed above, in addition to the modifications and hardware for global prefetch counting discussed above, one embodiment of a global pollution counting system of the invention further requires: a pollution counter to count the number of pollutions; instruction(s) to read/clear the pollution counter; and ability to trap on pollution counter overflow.

Those of skill in the art will readily recognize that the pollution counter, instruction(s) to read/clear the pollution counter, and ability to trap on pollution counter overflow can be often provided by using existing performance instrumentation counter infrastructure with a new counter event type.

In addition, to implement a hardware-based speculative access optimization according to one embodiment of the invention an additional table is required that contains a counter for each cache line set. According to the present invention, this table is called the speculative insertion, threshold table (SITT). In one embodiment of the invention, the SITT would be stored in the ETT.

According to the present invention, any one of numerous counter algorithms could be used with the SITT of the invention. In one embodiment, the counter algorithm is a simple saturating counter. In one example, the present invention is employed with a four-way set associative cache and a two bit up-down saturating counter is employed. In this embodiment, the counter value indicates the replacement ordering position.

Those of skill in the art will readily recognize that the additional hardware requirements discussed above, including the SITT and its operation, can be met by various hardware modifications and by using any one of several well-know methods and/or devices. Consequently, a more detailed discussion of these methods and structures is omitted here to avoid detracting from the present invention.

In another embodiment of the invention, the speculative access mechanism can be turned off when the prefetch/pollution counting is being employed for a different purpose.

Using the hardware-based speculative access optimization with the present invention, on a speculative insert, the cache line is inserted based on the entry in the SITT in the order stipulated by the two bit counter value and only those lines that have their replacement ordering modified, i.e., prior to the insert they were to be replaced after the updated line but now they are replaced before the updated line, have their A-bit set when the insertion is performed.

Using the hardware-based speculative access optimization with the present invention, on a speculative update, if the S-bit is set, then the replacement ordering is not changed. However, if the S-bit is not set, then the replacement ordering is modified based on the SITT entry. However, in this embodiment, the replacement ordering can only be increased, not decreased.

Using the hardware-based speculative access optimization with the present invention, on a speculative miss there is no change.

Using the hardware-based speculative access optimization with the present invention, on a non-speculative insert there is no change.

Using the hardware-based speculative access optimization with the present invention, on a non-speculative update if the access prefetched according to the global prefetch counting rules discussed above, then the SITT entry is decremented. However, if the SITT entry is already zero then the value remains zero.

Using the hardware-based speculative access optimization with the present invention, on a non-speculative miss if the access was polluted according to the rules of global pollution counting discussed above, then the SITT entry is incremented. However, if the entry is already three, or maximum, then it remains at maximum.

Compiler-Based Prefetch Tuning

One embodiment of the invention includes compiler-based prefetch tuning. Embodiments using compiler-based prefetch tuning are based on the per instruction address pollution counting system discussed above and therefore, are built upon the per instruction address prefetch counting embodiment of the invention discussed above. Consequently, it is assumed that all of the modifications and hardware for per instruction address prefetch counting are already implemented. In addition, one embodiment of per instruction address pollution counting of the invention is also built on the global pollution counting embodiment of the invention and therefore it is assumed that all of the modifications and hardware for global pollution counting are also already implemented. Consequently, it is assumed that the following modifications are present:

The S-bit (can use the same S-bit from global prefetch counting discussed above);

The A-bit (can use the same A-bit from global pollution counting discussed above);

The ETT (can use the same ETT from global pollution counting discussed above);

The IAT (can use the same IAT from per instruction address prefetch counting discussed above).

In addition to the modifications and hardware for per instruction address prefetch counting and global pollution counting discussed above, one embodiment of a per instruction address pollution counting system of the invention further requires a programmable pollution counter (just like the one discussed above for per instruction address prefetch counting) and the ability to trap on a pollution occurrence, as well as a method for reading the pollution information on a trap.

To deploy using compiler-based prefetch tuning according to one embodiment of the invention, a compiler or runtime system uses the per instruction address pollution counting system discussed above to determine which prefetches in a program are useful in a profile run. Then, according to the present invention, this information is fed back into the compiler to allow the compiler to determine which prefetches that were initiated were useful and which were not. According to this embodiment of the invention, the compiler can both minimize the number of useless prefetches issued and stop harmful prefetches from being issued.

Compiler-Based Layout Optimization

One embodiment of the invention includes compiler-based layout optimization. Embodiments using compiler-based layout optimization are based on the per instruction address pollution counting system discussed above and therefore, are built upon the per instruction address prefetch counting embodiment of the invention discussed above. Consequently, it is assumed that all of the modifications and hardware for per instruction address prefetch counting are already implemented. In addition, one embodiment of per instruction address pollution counting of the invention is also built on the global pollution counting embodiment of the invention and therefore it is assumed that all of the modifications and hardware for global pollution counting are also already implemented. Consequently, it is assumed that the following modifications are present:

The S-bit (can use the same S-bit from global prefetch counting discussed above);

The A-bit (can use the same A-bit from global pollution counting discussed above);

The ETT (can use the same ETT from global pollution counting discussed above);

The IAT (can use the same IAT from per instruction address prefetch counting discussed above).

In addition to the modifications and hardware for per instruction address prefetch counting and global pollution counting discussed above, one embodiment of a per instruction address pollution counting system of the invention further requires a programmable pollution counter (just like the one discussed above for per instruction address prefetch counting) and the ability to trap on a pollution occurrence, as well as a method for reading the pollution information on a trap.

In addition, to deploy the compiler-based layout optimization of this embodiment of the invention, the system must include the ability to mark address ranges as speculative. In one embodiment of the invention, this marking is done by employing a table in the system processor. The address ranges specified are then used to determine which accesses are tagged as speculative. Either instruction addresses or data addresses can be used.

According to one embodiment of a the compiler-based layout optimization of the invention, the compiler or runtime system determines if two data structures interfere with one another by first setting up the processor table of speculative accesses. Then when the processor reports the interference, the processor can also report which addresses in the ranges specified caused the pollution(s). In one embodiment of the invention, this information is used as a feedback mechanism to the compiler or runtime system to determine a better layout. The layout optimization can also be used to enhance the operating system coloring algorithm or to enhance any function that determines spatial proximity of objects, for example, garbage collection functions. The layout optimization can also be used to enhance virtual to physical address translations.

The foregoing description of an implementation of the invention has been presented for purposes of illustration and description only, and therefore is not exhaustive and does not limit the invention to the precise form disclosed. Modifications and variations are possible in light of the above teachings or may be acquired from practicing the invention.

Consequently, the scope of the invention is defined by the claims and their equivalents.

What is claimed is:

1. A method for monitoring prefetches due to speculative accesses in a computer system comprising:
   providing a processor for processing data;
   providing a cache memory, said cache memory capable of being accessed by said processor;
   providing an off-chip memory system, said off-chip memory system capable of being accessed by said processor;
   providing for speculative accesses by said processor to transfer data from said off-chip memory system to said cache memory system;
   modifying said processor such that said processor is capable of determining and labeling accesses as speculative and said processor is capable of indicating to said cache memory whether an access is speculative or non-speculative;
   providing said processor with a programmable prefetch counter that can be set, said prefetch counter for counting the number of prefetches, said prefetch counter providing said processor with the ability to trap on the occurrence of a predetermined state of said prefetch counter;
   providing a bit per tag called an S-bit, said S-bit indicating whether a cache line was accessed speculatively, wherein;
   a speculative insert of a cache line causes the S-bit of the cache line to be set, thereby changing the state of the cache line to the speculative state, further wherein;
   a speculative update of a cache line results in the setting of the S-bit of the updated cache line, thereby changing the state of the cache line to the speculative state, further wherein;
   a speculative miss of a cache line results in no change, further wherein;
   a non-speculative insert of a cache line results in the S-bit of the inserted cache line being cleared and the state of the cache line to be changed to the non-speculative state, further wherein;
   a non-speculative update of a cache line results in incrementing the prefetch count of said programmable prefetch counter if the updated cache line S-bit is set and the clearing of the S-bit of the cache line to the non-speculative state, further wherein;
   a non-speculative miss of a cache line results in no change.

2. The method for monitoring prefetches due to speculative accesses in a computer system of claim 1, wherein;
   said modifying said processor such that said processor is capable of determining and labeling accesses as speculative is accomplished by;
   providing a cache address bus;
   providing a bit line on said cache address bus to indicate whether an access is a speculative access.

3. The method for monitoring prefetches due to speculative accesses in a computer system of claim 2, wherein;
   modifying said processor such that said processor is capable of determining and labeling accesses as speculative is accomplished by providing said processor with a register that indicates what constitutes a speculative instruction.

4. A method for monitoring prefetches due to speculative accesses in a computer system comprising:
   providing a processor for processing data;
   providing a cache memory, said cache memory capable of being accessed by said processor;
   providing an off-chip memory system, said off-chip memory system capable of being accessed by said processor;
   providing for speculative accesses by said processor to transfer data from said off-chip memory system to said cache memory system;
   modifying said processor such that said processor is capable of determining and labeling accesses as speculative and said processor is capable of indicating to said cache memory whether an access is speculative or non-speculative;
   providing said processor with a programmable prefetch counter that can be set, said programmable prefetch counter for counting the number of prefetches, said programmable prefetch counter providing said processor with a table to hold instruction addresses called an instruction address table (IAT), wherein, the instruction address of a prefetched instruction is stored in the IAT;
   providing said processor with the ability to trap according to a predetermined condition of said programmable prefetch counter, wherein, when a trap occurs a sample is taken from said prefetch occurrence that caused the trap;
   providing a bit per tag called an S-bit, said S-bit indicating whether a cache line was accessed speculatively, wherein;
   a speculative insert of a cache line causes the S-bit of the cache line to be set, thereby changing the state of the cache line to the speculative state, and the address to be stored, further wherein;
   a speculative update of a cache line results in the setting of the S-bit of the updated cache line, thereby changing the state of the cache line to the speculative state, further wherein;
   a speculative miss results in no change, further wherein;

a non-speculative insert of a cache line results in the S-bit of the inserted cache line being cleared, thereby changing the state of the cache line to the non-speculative state, further wherein;

a non-speculative update of a cache line results in incrementing the prefetch count of said programmable prefetch counter, the clearing of the S-bit if the updated cache line S-bit is set and, if said prefetch counter reaches said predetermined state and the present instruction caused the predetermined state, a trap is initiated, the address of the instruction that caused the trap is supplied from the IAT, and the data address of the prefetched cache line is supplied, further wherein;

a non-speculative miss results in no change.

5. The method for monitoring prefetches due to speculative accesses in a computer system of claim 4, wherein;

said modifying said processor such that said processor is capable of determining and labeling accesses as speculative is accomplished by;

providing a cache address bus;

providing a bit line on said cache address bus to indicate whether an access is a speculative access.

6. A method for monitoring pollutions due to speculative accesses in a computer system comprising:

providing a processor for processing data;

providing a cache memory, said cache memory capable of being accessed by said processor;

providing an off-chip memory system, said off-chip memory system capable of being accessed by said processor;

providing for speculative accesses by said processor to transfer data from said off-chip memory system to said cache memory system;

modifying said processor such that said processor is capable of determining and labeling accesses as speculative and said processor is capable of indicating to said cache memory whether an access is speculative or non-speculative;

providing said processor with a programmable prefetch counter that can be set, said programmable prefetch counter for counting the number of prefetches, said programmable prefetch counter providing said processor with the ability to trap on the occurrence of a predetermined state of said prefetch counter;

providing a bit per tag called an S-bit, said S-bit indicating whether a cache line was accessed speculatively;

providing a bit per tag called an A-bit, said A-bit indicating whether a cache line was affected by a speculative access;

providing a table called an evicted tag table (ETT), said ETT containing one tag entry per cache set, entries in said ETT being used to store the most recently evicted cache line in the case that it was evicted because a speculative access occurred;

providing a pollution counter to count the number of pollutions;

providing instructions to read and clear said pollution counter;

modifying said processor such that said processor traps upon a predetermined state of said pollution counter, wherein;

a speculative insert of a cache line causes the S-bit of the cache line to be set, thereby changing the state of the cache line to the speculative state, the A-bit to be set of all other cache lines that do not have their S-bits set, thereby changing the state of all other cache lines that do not have their S-bits set to A-state, and the tag of the evicted cache line is moved to the ETT entry for this set, further wherein;

a speculative update of a cache line results in the setting of the S-bit of the updated cache line, thereby changing the state of the cache line from the non-speculative state to the speculative state and, if this access modifies the replacement ordering of the cache set, then the A-bits of all cache lines that had their replacement ordering modified are set and their S-bits are set to zero, further wherein;

a speculative miss of a cache line results in no change, further wherein;

a non-speculative insert of a cache line results in the S-bit of the inserted cache line being cleared and the state of the cache line being set to the non-speculative state and, if the evicted entry has the A-bit set, then the tag of the evicted cache line is moved to the ETT entry for the cache set, further wherein;

a non-speculative update of a cache line results in incrementing the prefetch count of said programmable prefetch counter if the updated cache line S-bit is set, the clearing of the S-bit, thereby changing the state of the cache line to the non-speculative state, clearing of the A-bit of all other cache lines, thereby changing the state of all other cache lines to the non-speculative state, and invalidating the ETT entry for this cache set, further wherein;

a non-speculative update of a cache line results in a change of state from the A-state to the non-speculative state, further wherein;

in the event of a non-speculative miss of a cache line, if the ETT entry for the set is valid and equals the tag of the accessed cache line, then the pollution count of said pollution counter is incremented and the ETT entry for this cache set is cleared.

7. The method for monitoring prefetches due to speculative accesses in a computer system of claim 6, wherein;

said modifying said processor such that said processor is capable of determining and labeling accesses as speculative is accomplished by;

providing a cache address bus;

providing a bit line on said cache address bus to indicate whether an access is a speculative access.

8. The method for monitoring pollutions due to speculative accesses in a computer system of claim 7, wherein;

modifying said processor such that said processor is capable of determining and labeling accesses as speculative is accomplished by providing said processor with a register that indicates what constitutes a speculative instruction.

9. A method for monitoring pollutions due to speculative accesses in a computer system comprising:

providing a processor for processing data;

providing a cache memory, said cache memory capable of being accessed by said processor;

providing an off-chip memory system, said off-chip memory system capable of being accessed by said processor;

providing for speculative accesses by said processor to transfer data form said off-chip memory system to said cache memory system;

modifying said processor such that said processor is capable of determining and labeling accesses as speculative and said processor is capable of indicating to said cache memory whether an access is speculative or non-speculative;

providing said processor with a programmable prefetch counter that can be set, said programmable prefetch counter for counting the number of prefetches, said programmable prefetch counter providing said processor with a table to hold instruction addresses called an instruction address table (IAT), wherein, the instruction address of a prefetched instruction is stored in the IAT;

providing said processor with the ability to trap on the occurrence of a predetermined state of said prefetch counter, wherein, when said prefetch counter reaches said predetermined state, a trap occurs and a sample is taken from said prefetch that caused said trap;

providing a bit per tag called an S-bit, said S-bit indicating whether a cache line was accessed speculatively;

providing a bit per tag called an A-bit, said A-bit indicating whether or not a cache line was affected by a speculative access;

providing a table called an evicted tag table (ETT), said ETT containing one tag entry per cache set, entries in said ETT being used to store the most recently evicted cache line in the case that it was evicted because a speculative access occurred;

providing a pollution counter to count the number of pollutions;

providing instructions to read and clear said pollution counter;

modifying said processor such that said processor traps upon said predetermined state of said pollution counter, wherein;

a speculative insert of a cache line causes the S-bit of the cache line to be set, thereby changing the state of the cache line to the speculative state, the A-bit to be set of all other cache lines that do not have their S-bits set, thereby changing the state of all other cache lines that do not have their S-bits set to A-state, the tag of the evicted cache line is moved to the ETT entry for the set and, the instruction address to be stored, further wherein;

a speculative update of a cache line results in the change of state from the A-state to the speculative state, further wherein;

a speculative update of a cache line results in the setting of the S-bit of the updated cache line, thereby changing the state of the cache line from the non-speculative state to the speculative state and, if the access modifies the replacement ordering of the cache set, then the A-bits of all cache lines that had their replacement ordering modified are set and their S-bits are set to zero, further wherein;

a speculative miss results in no change, further wherein;

a non-speculative insert of a cache line results in the S-bit of the inserted cache line being cleared, thereby changing the state of the cache line to the non-speculative state, and if the evicted entry has the A-bit set, then the tag of the evicted cache line is moved to the ETT entry for this cache set, further wherein;

a non-speculative update of a cache line results in incrementing the prefetch count of said programmable prefetch counter if the updated cache line S-bit is set, clearing the S-bit, thereby changing the state of the cache line to the non-speculative state, clearing the A-bit of all other cache lines, thereby changing the state of all other cache lines to the non-speculative state, invalidating the ETT entry for this cache set, supplying the instruction address, and supplying the data address, further wherein;

a non-speculative update of a cache line results in a change of state from the A-state to the non-speculative state; and a non-speculative miss of a cache line results in the pollution count of said pollution table being incremented, the ETT entry for the cache set being cleared, the instruction address being supplied, and the data address being supplied.

10. The method for monitoring prefetches due to speculative accesses in a computer system of claim 9, wherein;

said modifying said processor such that said processor is capable of determining and labeling accesses as speculative is accomplished by;

providing a cache address bus;

providing a bit line on said cache address bus to indicate whether an access is a speculative access.

* * * * *